Nov. 24, 1970     E. DANA     3,541,818

KEY

Filed July 5, 1968

INVENTOR
Eugene Dana
BY
Wolf, Greenfield & Sacks
ATTORNEYS

United States Patent Office 3,541,818
Patented Nov. 24, 1970

3,541,818
KEY
Eugene Dana, 922 19th St., Apt. A,
Santa Monica, Calif. 90404
Filed July 5, 1968, Ser. No. 742,603
Int. Cl. E05b 19/04, 19/26
U.S. Cl. 70—393                                         3 Claims

ABSTRACT OF THE DISCLOSURE

A key made of a thermosetting plastic material and having a bundle of glass filaments that extend through the shank and into the head that reinforce the plastic and having a metal staple with arms embedded in the head to form a loop for supporting the key.

---

This invention relates to an improved key.

Keys are conventionally made of metal ground to a desired shape and are relatively heavy and expensive to fabricate. With continued use metal keys demonstrate some wear. Because of their weight, a number of keys constitute a considerable load when carried in the pocket.

One important object of this invention is to provide a key which is extremely light in weight and which is relatively inexpensive to fabricate and does not require a large inventory of key blank.

Another important object of this invention is to provide a key which has self lubricating properties so that it exhibits negligible wear even with abnormally heavy and prolonged use.

Still another important object of this invention is to provide a molded key which is composed of a plastic material and which nevertheless possesses substantially the strength of conventional metal keys.

To accomplish these and other objects, the key of this invention is made of a plastic material. In the preferred embodiment of this invention both the head and the shank are made of the same material and molded as one piece, and the two are reinforced by a bundle of glass filaments that extend through the shank and into the head. Preferably an eye is formed in the key head by means of a metal staple with its arms partially embedded in it but with its mid portion extending out of the head to form a loop that defines the eye.

These and other objects and features of this invention will be better understood and appreciated from the following detailed description of one embodiment thereof, selected for purposes of illustration and shown in the accompanying drawing, in which.

Figure 1:
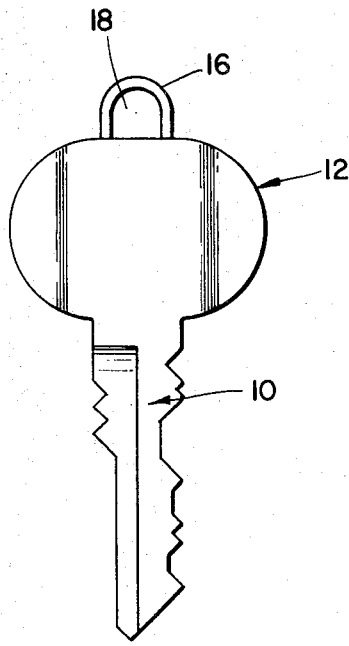
FIG. 1 is a side view of a key constructed in accordance with this invention.
Figure 2:
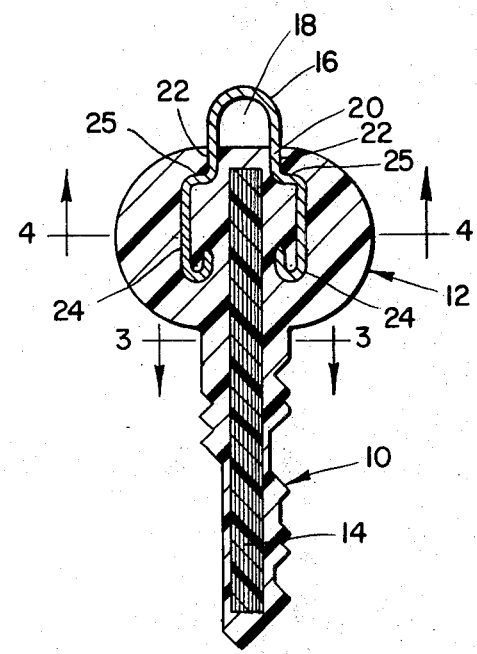
FIG. 2 is a vertical cross section through the key of FIG. 1.
Figure 3:
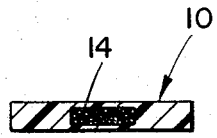
Figure 4:
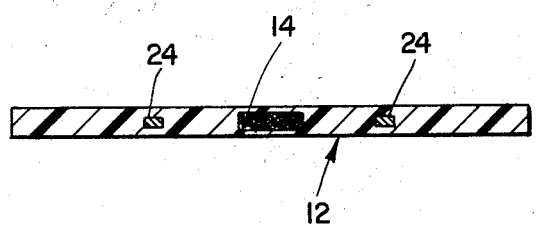

FIGS. 3 and 4 are cross-sectional views taken along the section lines 3—3 and 4—4 of FIG. 2.

The key of this invention has the general appearance of a conventional key with a shank 10 and head 12. The shank 10 is provided with a series of cam surfaces that are arranged and configured to actuate the tumblers in the lock for which the key is designed. Obviously the particular configuration of the cams and the shape of the shank form no part of this invention.

The shank 10 and head 12 are made of a thermosetting material such as an epoxy which is mixed with a catalyst and may be heated to accelerate setting. Typically the epoxy may be C-7 base H-20 activation made by Armstrong Products Co. In the preferred form a reinforcing member 14 extends throughout the length of the shank 10 and in the preferred form terminates near to the top of the head 12.

The reinforcing member in the embodiment shown is composed of a plurality of fibers, typically made of glass. A group of filaments together make up a strand, and the strands make up a bundle of parallel strands that extend through the shank and into the head. In the preferred form of this invention, the strands made of glass each may have a diameter of approximately .010–.015 inch, and the bundle may include approximately 200 of such strands. The strands are all loose within the key and the plastic material flows about the individual strands during molding, so as to achieve maximum strength from them.

A staple 16 made of metal is shown in FIG. 2 to be embedded in the head 12 and forms an eye 18 through which a chain or hook may pass so that the key may conveniently be carried on a ring, key case or some similar holder. The staple 16 has a midportion 20 which is shown in FIG. 2 to be in the shape of an inverted U, and the lower ends of the arms 22 each carry a hook-shaped extension 24 which turn at their lower ends through approximately 180°. The hook-shaped extensions are offset from the arms by bends 25 to enhance the anchoring of the extensions in the molded head. The extensions 24 in the embodiments shown are relatively thin in the plane of the head 12 and are readily embedded in the plastic which makes up the head. Because they are not round, they will not readily twist in the plastic. The U-shaped portion preferably is round in cross section for added strength outside the plastic head and to form a relatively smooth surface through which a key chain may extend and which will allow the key to move readily on the chain from one link to the next.

Both the reinforcing member 14 and the staple 16 are embedded in the plastic material which comprises the shank 10 and head 12, and the plastic material is molded about them. In the manufacture of the key, the staple and reinforcing member are suspended in the mold so as to allow the material to flow about them and so that they may in turn be firmly embedded in place.

It is evident that the thermosetting material from which the key is made can be provided with a filler containing a luminescent material that will enable the key made of it to be seen when there is not any light in the area. It is also evident that the plastic from which the key is made may carry any one of a variety of different pigments so as to give the key a distinct color to help the owner identifying it.

It will be appreciated from the foregoing description that a key made as shown in the drawing will achieve the several objects outlined. Thus, the key will have the necessary strength particularly through the reinforcement provided by the member 14 and the staple 16, and the material from which the key is made has a self lubricating property to inhibit any wear of the key. The material from which the key is made is extremely light, in weight being but a fraction of the weight of a comparable key made of metal, and therefore a party called upon to carry a number of such keys will have a considerably smaller burden. The plastic material is itself extremely strong, and will not soften or distort when heated.

Because numerous modifications of this invention will be apparent to those skilled in the art after reading the foregoing description, it is not intended to limit the breadth of this invention to the single embodiment illustrated and described.

What is claimed is:

1. A key comprising an enlarged head and an integral shank made of an epoxy plastic material molded as a unitary structure, a reinforcing member embedded in the shank and formed of a plurality of glass strands extending parallel to one another from the end of the shank into the head, said shank defining a plurality of cam surfaces constructed and arranged to actuate a lock tumbler, and a staple embedded in the head and defining an eye in the head.

2. A key in accordance with claim 1 and further comprising said glass strands being in the order of 0.010 to 0.015 inch in diameter and approximately 200 of the strands making up said reinforcing member.

3. A key in accordance with claim 1 and further comprising, said staple being generally U-shaped with the arms of the U embedded in the head and with the bend extending out of the top of the head to form the eye, and hook-like extensions connected to the ends of the arms for retaining the staple in the head.

References Cited

UNITED STATES PATENTS

| 878,739 | 2/1908 | Newman | 24—116 |
| 2,571,692 | 10/1951 | Dubois | 43—18 |
| 2,714,304 | 8/1955 | Dedda | 70—406 |
| 2,809,144 | 10/1957 | Grimes | 156—192 |
| 2,932,963 | 4/1960 | Walker | 70—408 |
| 2,951,780 | 9/1960 | Bushman | 154—75 |
| 3,313,135 | 4/1967 | Reisner | 70—408 |
| 3,335,049 | 8/1967 | Pultz | 161—176 |
| 3,413,186 | 11/1968 | Marzocchi | 161—176 |

FOREIGN PATENTS 934,838   8/1963   Great Britain.

MARVIN A. CHAMPION, Primary Examiner

R. L. WOLFE, Assistant Examiner

U.S. Cl. X.R.

70—406, 408